United States Patent [19]
McKee

[11] 3,861,713
[45] Jan. 21, 1975

[54] RETRACTILE DOOR STEP FOR MOTOR HOMES

[76] Inventor: Dale P. McKee, 204 White St., Salisbury, Md. 91801

[22] Filed: Jan. 23, 1974

[21] Appl. No.: 435,847

[52] U.S. Cl.................... 280/166, 182/78, 182/88
[51] Int. Cl............................................. B60r 3/02
[58] Field of Search .............. 182/88, 78; 280/166; 105/449, 443, 444, 437

[56] References Cited
UNITED STATES PATENTS

| | | | |
|---|---|---|---|
| 438,021 | 10/1890 | Robbins | 280/166 |
| 3,229,993 | 1/1966 | Riddle | 182/88 |
| 3,329,443 | 7/1967 | Lowder | 182/88 |
| 3,572,754 | 3/1971 | Fowler | 280/166 |
| 3,751,068 | 8/1973 | Green | 280/166 |
| 3,762,742 | 10/1973 | Bucklen | 280/166 |
| 3,771,815 | 11/1973 | Bridges | 280/166 |
| 3,807,758 | 4/1974 | Rogge | 182/88 |

FOREIGN PATENTS OR APPLICATIONS 574    2/1857    Great Britain...................... 280/166

*Primary Examiner*—Reinaldo P. Machado
*Attorney, Agent, or Firm*—William H. Maxwell

[57] ABSTRACT

A door step or platform shiftable to an extended working position in response to partial opening of a door and locked in said working position and disengaged from said door for complete opening thereof, and also adapted to be shifted to a retracted stored position in response to closing of said door through reengagement therewith, and to the end that the platform and door remain in readiness for the next subsequent extension of said platform by opening of said door. The means therefor is embodied in hardware adapted to motor homes and the like and characterized by a geared linkage that multiplies limited angular displacement of the door for augmented angular displacement of the said platform between said extreme opposite positions.

17 Claims, 5 Drawing Figures

PATENTED JAN 21 1975

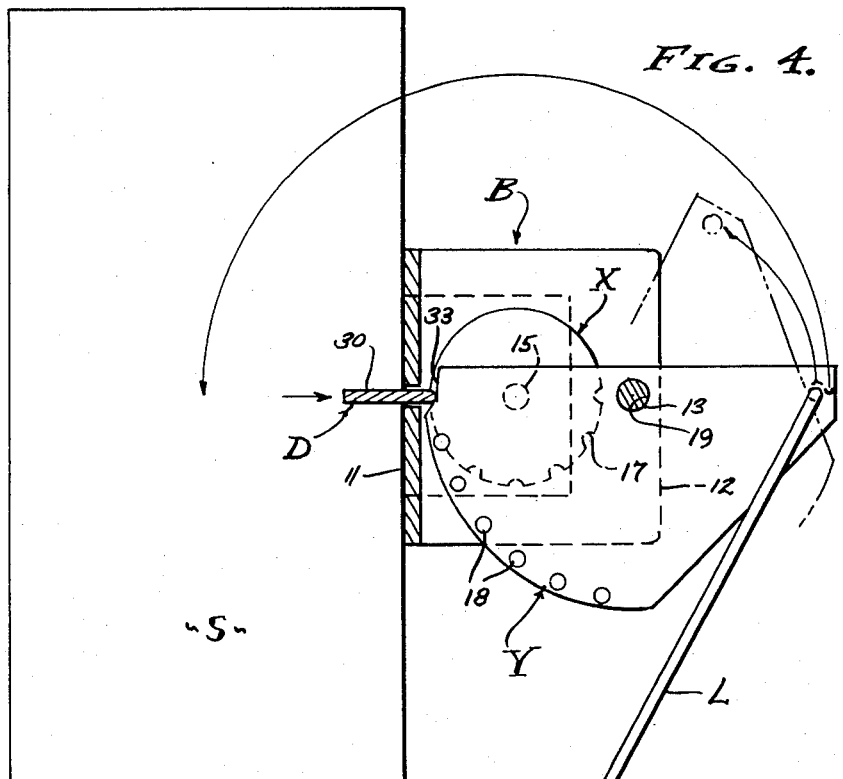
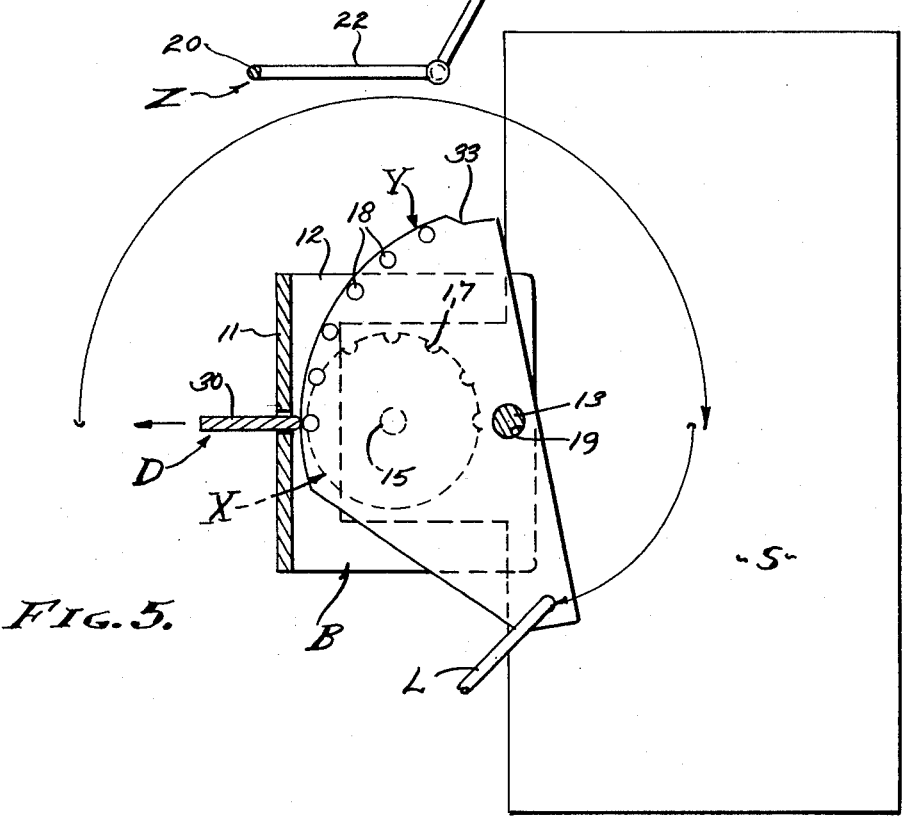

RETRACTILE DOOR STEP FOR MOTOR HOMES

BACKGROUND

The present invention relates to platforms for the doorways of vehicle bodies and especially to door steps for motor homes and the like. Bodies of the type under consideration are of substantial width and projections from the side thereof are dangerous and are to be avoided. Therefore, door steps and platforms at the sides of such vehicles have been minimized and are generally inadequate. However, with the present invention, an adequate platform or step is provided with retractability thereof, it being a general object of this invention to provide a unit of hardware applicable to the vehicle body and which alternately extends or retracts a step with movement of the door which it services.

Doors into vehicles of the type under consideration are more or less flush with the exterior contour of the body in which they are installed, protrusions being minimized. For example the handle and hinges are substantially flush with the exterior surface of the body. The door sill too is substantially flush and most often of a height which requires a step, down to ground level; and in any case greatly enhanced by a porch like platform or step. But, the permanent or temporary attachment of such a step is not altogether satisfactory, since such a permanent projection cannot be tolerated and because removal then requires provision for handling and storage, etc. It is an object therefore, to provide automatic retractability in a permanent step installation, responsive to opening and/or closing of the door associated therewith and locked in working position for independent completed opening of said door.

The ingress and especially egress from a vehicle of the type under consideration is a problem when the facility of a step is lacking; reference being made to situations where a person exits from the vehicle by opening a door without first extending or adapting a step, in which case a step-down is obviously lacking. In such an instance, a 90° opening movement of the door is to be expected while a complete reversal in position of the retracted step is required. It is therefore, an object of this invention to provide a linkage which relates a partially open condition of the door to a completely extended condition of the step, with automatically releasible lock means for the step in said condition. It is also an object to provide for retractible conditioning of said step related to closed conditioning of said door.

It is another object of this invention to provide a hardware unit for the purpose thus far described that is rugged and durable, and adapted to universal installation on a multitude of vehicle constructions, and characterized by direct trussed bracing into the step per se, so that the step is firm and reliable.

DRAWINGS

The various objects and features of this invention will be fully understood from the following detailed description of the typical preferred form and application thereof, throughout which description reference is made to the accompanying drawings, in which:

FIG. 4 is a plan section taken as indicated by line 4—4 on FIG. 1, and

FIG. 5 is a view similar to FIG. 4 showing the alternate retracted position of the extensible step, as caused by closing of the vehicle door.

PREFERRED EMBODIMENT

Figure 1:
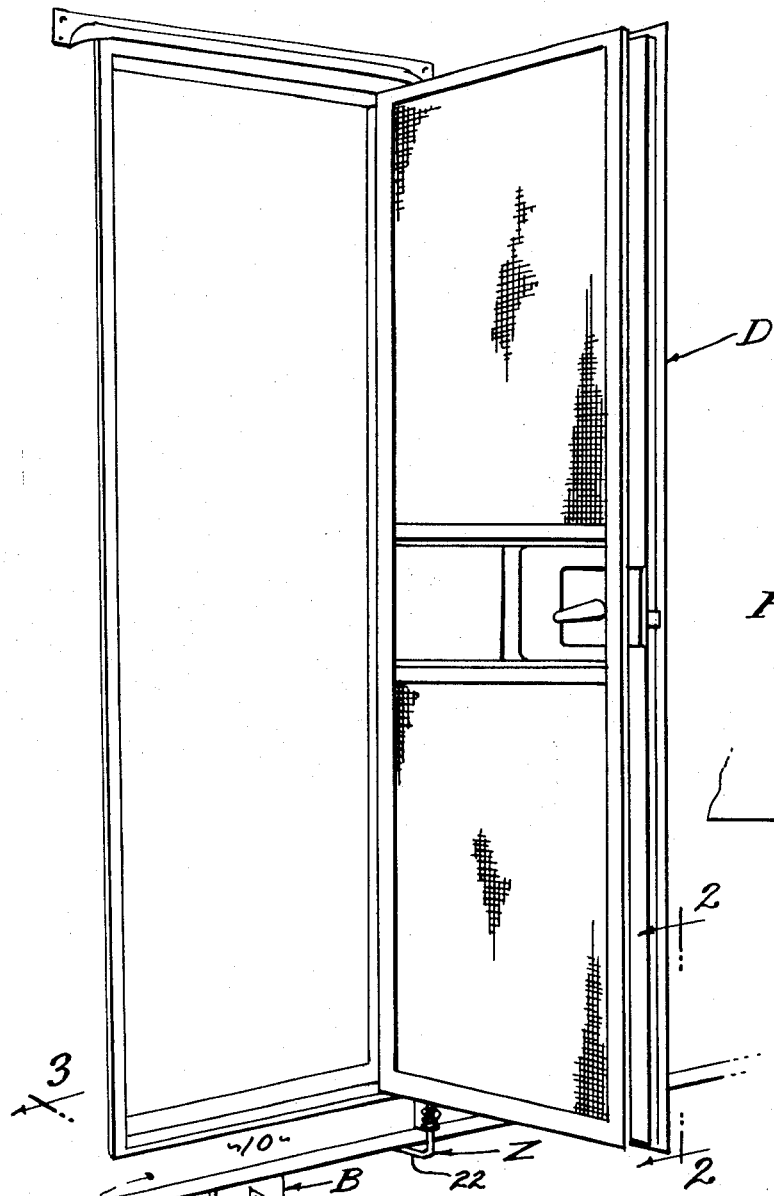
FIG. 1 is a perspective view illustrating a vehicle door opened 90°, with the extensible step of the present invention extended thereby to a fully opened position where it is automatically locked.
Figure 2:
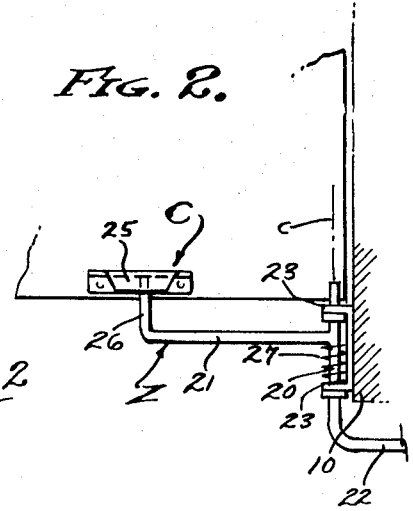
FIG. 2 is a view taken substantially as indicated by line 2—2 on FIG. 1.
Figure 3:
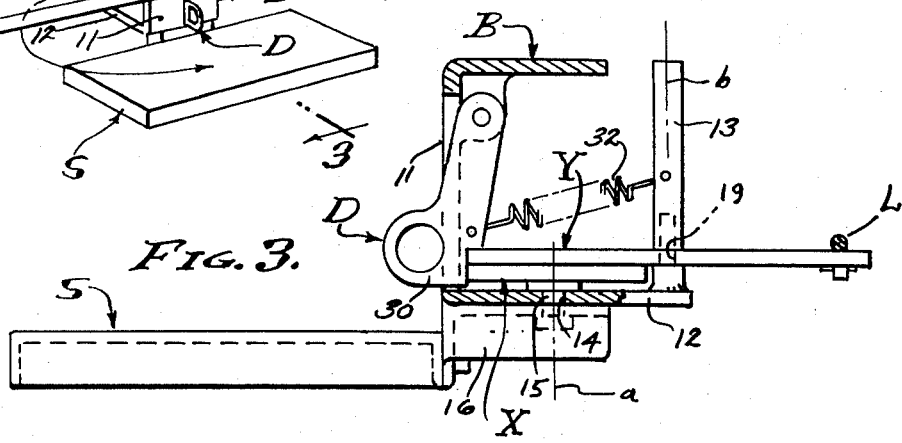
FIG. 3 is an enlarged sectional view taken as indicated by line 3—3 on FIG. 1.

The usual height of a living deck of a mobile home requires one or more steps down to the ground level, and the access doors are invariably flush with the exterior contour of the vehicle body. Consequently, there is no sill at the exterior of the vehicle body and the step-down to ground level requires the convenience of a platform or step S projecting from the vehicle at a level between the deck and the ground. The provision of such a step S is to be enhanced by its permanance and retractability, and in accordance with the present invention the step S is retractile from an extended working position to a retracted stored position, being angularly displaceable and characterized by planar movement through 180° between said opposite positions.

The doors D of vehicles of the type under consideration are effective for ingress and egress when partially open to 90°, while they are often secured flat against the vehicle body in a fully opened 180° position. Also, normal use and opening of such doors requires more or less 90° movement, but not an exact angular displacement thereof, and always according to the desires and/or whims of the persons opening and closing the same. However, a nominally adequate opening of such a door is 90°, and it is this angular displacement that I have adopted and employ in shifting the step S from its retracted stored position to its extended working position, and vice versa. It is to be understood that this decrease of displacement can vary as circumstances require, there being coupling means C to disengageably connect the door D to the actuation later described for motivating the step S.

Referring now to the unit of hardware that I have provided, there is a platform or step S shiftably carried by a bracket B to move in a horizontally disposed plane between a retracted stored position and an extended working position. The bracket B is secured to the side rail or frame of the vehicle body to depend therefrom beneath the flush door sill 10, there being a support gear X journaled on a vertical axis in the bracket B with its periphery at the vertically disposed face of the bracket B substantially in the side plane of the vehicle body. A drive gear Y engageably embraces the gear X to have a multiplying effect, being journaled in the bracket B inward of said gear X. And a lever Z is disposed on a vertical axis parallel to the hinge axis of the door D with coupling means C disengageably connecting the lever Z thereto, there being a link L operatively connecting the gear Y and lever Z. In the embodiment shown, the gear Y revolves through an angular displacement of 60° while the lever Z operates through an angular displacement of 90°.

The bracket B is provided to present a downward extension of the side of the vehicle body, below the doorway, and to support the step S and its operating mechanism. As shown, the bracket B involves, generally, a vertically disposed face plate 11 and horizontally disposed mounting plate 12. The face plate depends from the door sill 10 where it is secured to the frame or rail of the vehicle body by means of screw fasteners or the like. The mounting plate extends inwardly from the face plate and in a plane spaced downward from the sill 10. A stabilizing post 13 projects upwardly from the rear extremity of the mounting plate, and is cut or adjustable as to height so as to bear against the underside of the vehicle body for stability.

The step S is a platform or porch-like deck member that swings between the extreme positions; diametrically opposite and extended retracted positions as shown. Thus, the angular displacement of the step is 180° about its vertically disposed turning axis *a* coincidental with the axis of support gear X later described. A bearing opening 14 in the mounting plate 12 journals a free turning shaft 15 projecting vertically from a side margin of the step S, preferably a brace 16 extended to one side thereof; the top face of the brace and the bottom face of the support gear X embracing the mounting plate 12 to hold the step horizontally disposed. The gear X is keyed to the shaft 15 fixed to the step brace. Thus, the step S is swingable to the opposite positions shown, one retracted beneath the vehicle body and one extended and disposed outside and parallel to the vehicle body.

The support gear X is characteristically a small gear, as compared with drive gear y, and is adapted to revolve through an angular displacement of at least 180°; and to this end it has an exposed toothed periphery coextensive with half of its circumference. The drive gear Y is characteristically a large gear, as compared with support gear X, and is adapted to revolve through a limited angular displacement and toothed periphery of 60° in the embodiment shown. The two gears can be segments, as is shown in the case of gear Y, and the pitch diameter ratio, or equivalent thereof, is 3 to 1, whereby movement of gear Y through 60° revolves gear X through 180°.

The gear tooth formation of gears X and Y can vary, the former being in the nature of an external gear and the latter an internal gear. However, the drive gear Y is disengageable from the support gear X and gear tooth forms for this purpose can be involved; and it is to this end that I have provided disengageable gear forms established as a circumferential series of cogs 17 in the gear X and intermeshing drive pins 18 on the gear Y. In the interest of compactness, the drive gear Y overlies the supporting gear X, the post 13 being disposed on an axis *b* and providing the bearing 19 for free turning of the drive gear. It will be observed that the 3 to 1 ratio and corresponding difference in gear diameters provides for the accommodation and embracement of gear X beneath gear Y, to receive the drive pins 18 projecting normal from the underside of said drive gear. Thus, it is a direct 3 to 1 geared engagement that displaces the support gear X and step S 180° as a result of 60° displacement of drive gear Y.

The lever Z is provided to operate the drive gear Y by movement of the vehicle door, and is a first class lever, in the form of a bell crank, having a vertically disposed transfer shaft 20 on an axis *c* with upper and lower actuating arms 21 and 22. The shaft 20 is disposed as close as practically possible to the hinge axis of the vehicle door, by means of spaced bearings 23 between which the arm 22 projects to disengageably connect with said door. In practice the bearings 23 project from a plate secured to the side of the vehicle body by screw fasteners, and the shaft depends from the lowermost bearing 23 where the arm 21 projects inwardly beneath the body to swing through an operating arc of 90°. The drive gear Y has a lever 24, projecting inwardly, to be parallel with arm 21 when both are at a midpoint of movement. And the link L is pivotally connected to the ends of the arm and the lever which are proportioned so that 90° displacement of the former results in 60° displacement of the latter. The pivotal connections permit planar displacement of the arm and lever.

The coupling means C is provided to disengageably connect the actuation arm 22 to the vehicle door, and in its preferred form involves a guide channel 25 opening downward at the lower margin of the vehicle door, to disengage a pin 26 upstanding at the terminal end of the actuating arm 22. The shaft 20 is shiftable in the spaced bearings 23 therefor, and a spring 27 yieldingly elevates the bell crank assembly so as to releasably engage the pin 26 in said channel 25. By downward manual shifting of the shaft 20, pin 26 is displaced from the door channel 25 permitting the door to be moved alternately closed or to a fully opened position, while presenting an intermediate stop for the door when permitted to be elevated by means of said spring.

In accordance with this invention, an automatic lock means D is provided to secure the step in its extended position, and held released when disengaged and moved toward the retracted position. As shown, there is a latch 30 carried by the face plate 11 and moveable into and out of engagement with the peripheral portion of one of the gears, and preferably the support gear X. In its preferred form, the latch 30 is radially shiftable from the periphery of gear X and is disengageable in a cog 17 aligned with the latch when said gear X and step S are in the extended position. In practice, the latch 30 is a plate that swings through a vertical slot in face plate 11, and pivoted behind plate 11 with a ring opening disposed forward of said plate for accessible manual operation. A spring 32 yieldingly urges the latch 30 into engagement with the periphery of drive gear Y, there being a depression 33 therein aligned with the latch 30 when said gear Y and step S are in the extended position. Depression 33 extends at least 90° beyond said alignment and permits the latch 30 to drop into and remain in cog 17 while the last engageable drive pin 18 withdraws from cog 17 to be disengaged therefrom. The latch 30 remains disengageable from the notch in gear X by means of manual engagement through the ring opening in the latch and moving the same out of locking engagement. Thus, the drive gear Y is automatically disengageable from the support gear X which is locked in the step extending position while the vehicle door is operable through a continued opening movement, to be reengaged when returned through the aforesaid 90° and reentry of the drive pin 18 into the cog 17 for reengagement of gears X and Y with simultaneous release of latch 30 from gear X as caused by continued movement of drive gear Y, said latch riding upon the periphery of said drive gear. The fully closed door automatically locks the step S in the retracted position.

Having described only a typical preferred form and application of my invention, I do not wish to be limited or restricted to the specific details herein set forth, but wish to reserve to myself any modifications or variations that may appear to those skilled in the art:

Having described my invention, I claim:

1. An extensible step for a door and retractible beneath the door sill and operated by opening and closing of said door, and including; a bracket having a depending face plate secured to the door sill and a horizontally disposed mounting plate extending inwardly therefrom beneath the sill, the door step being horizontally journaled to swing beneath the mounting plate upon a vertical shaft and between a retracted position inward of the door sill and an extended position outward thereof, a support gear fixed to said shaft and operable between said retracted and extended positions, a larger drive gear journaled upon the mounting plate and intermeshed with the support gear and operable at substantially less angular displacement, and lever means connected between the first mentioned door and said drive gear to displace the latter and support gear and step in response to opening and closing of said door to effect a corresponding extension and retraction thereof.

2. The extensible step as set forth in claim 1 wherein the support gear is fixed to the shaft above the mounting plate of the bracket and carries the weight on the step through said shaft.

3. The extensible step as set forth in claim 1 wherein the support gear is an external gear and the drive gear overlies the same peripherally intermeshed therewith.

4. The extensible step as set forth in claim 1 wherein the support gear is an external gear and the drive gear is journaled upon the mounting plate inward thereof and overlies the same peripherally intermeshed therewith.

5. The extensible step as set forth in claim 1 wherein the support gear has peripheral cogs and the drive gear has drive pins peripherally intermeshed therewith.

6. The extensible step as set forth in claim 1 wherein the support gear has peripheral cogs and the drive gear is journaled upon the mounting plate inward thereof and overlying the same with drive pins peripherally intermeshed therewith.

7. The extensible step as set forth in claim 1 wherein the lever means comprises a bell crank having an actuating arm connected to the door and an actuating arm connected to the drive gear by a link pivoted thereto and extending therebetween.

8. The extensible step as set forth in claim 1 wherein the lever means comprises a bell crank having an actuating arm releasably connected to the door and an actuating arm connected to the drive gear by a link extending therebetween.

9. The extensible step as set forth in claim 1 wherein the lever means comprises a bell crank having a vertically disposed shaft installed close to the hinge axis of said first mentioned door and an actuating arm actuated by a slot on the door engaged therewith and an actuating lever connected to the drive gear by a link extending between said arms.

10. The extensible step as set forth in claim 1 wherein the lever means comprises a bell crank having a vertically depressible shaft installed close to the hinge axis of said first mentioned door, and an actuating arm actuated by a downwardly opening slot on the door disengageable therefrom by depression of the same and an actuating arm connected to the drive gear by a link extending between said arm.

11. An extensible step for a door and retractible beneath the door sill and operated by opening and closing of said door, and including; a bracket having a depending face plate secured to the door sill and a horizontally disposed mounting plate extending inwardly therefrom beneath the sill, the door step being horizontally journaled to swing beneath the mounting plate upon a vertical shaft and between a retracted position inward of the door sill and an extended position outward thereof, a support gear fixed to said shaft and operable between said retracted and extended positions, a larger drive gear journaled upon the mounting plate and intermeshed with the support gear and operable at substantially less angular displacement, lever means connected between the door and said drive gear to displace the latter and support gear and step in response to opening and closing of said door to effect a corresponding extension and retraction thereof, and lock means responsive to an open position of the door and disengageably securing the door step in the extended position.

12. The extensible step as set forth in claim 11 wherein the lock means is engageable with the drive gear to disengageably lock the support gear and step.

13. The extensible step as set forth in claim 11 wherein the said lock means comprises a latch disengageable from the support gear.

14. The extensible step as set forth in claim 11 wherein the said lock means comprises a latch disengageable from the support gear through peripheral engagement with the drive gear when said gears are driveably engaged.

15. The extensible step as set forth in claim 11 wherein the said lock means comprises a spring biased latch urged thereby into a cog in the support gear, with manually engageable means to disengage the same.

16. The extensible step as set forth in claim 11 wherein the said lock means comprises a spring biased latch urged into engagement with the smooth periphery of the drive gear having a recess aligned with a cog in the support gear when the step is in the extended position.

17. The extensible step as set forth in claim 11 wherein the said lock means comprises a spring biased latch urged into engagement with the smooth periphery of the drive gear having a recess aligned with a cog in the support gear when the step is in the extended position, and with a manually engageable means to disengage said latch from said cog.

* * * * *